No. 853,285. PATENTED MAY 14, 1907.
W. L. WATERS.
DYNAMO ELECTRIC MACHINE.
APPLICATION FILED SEPT. 5, 1905.
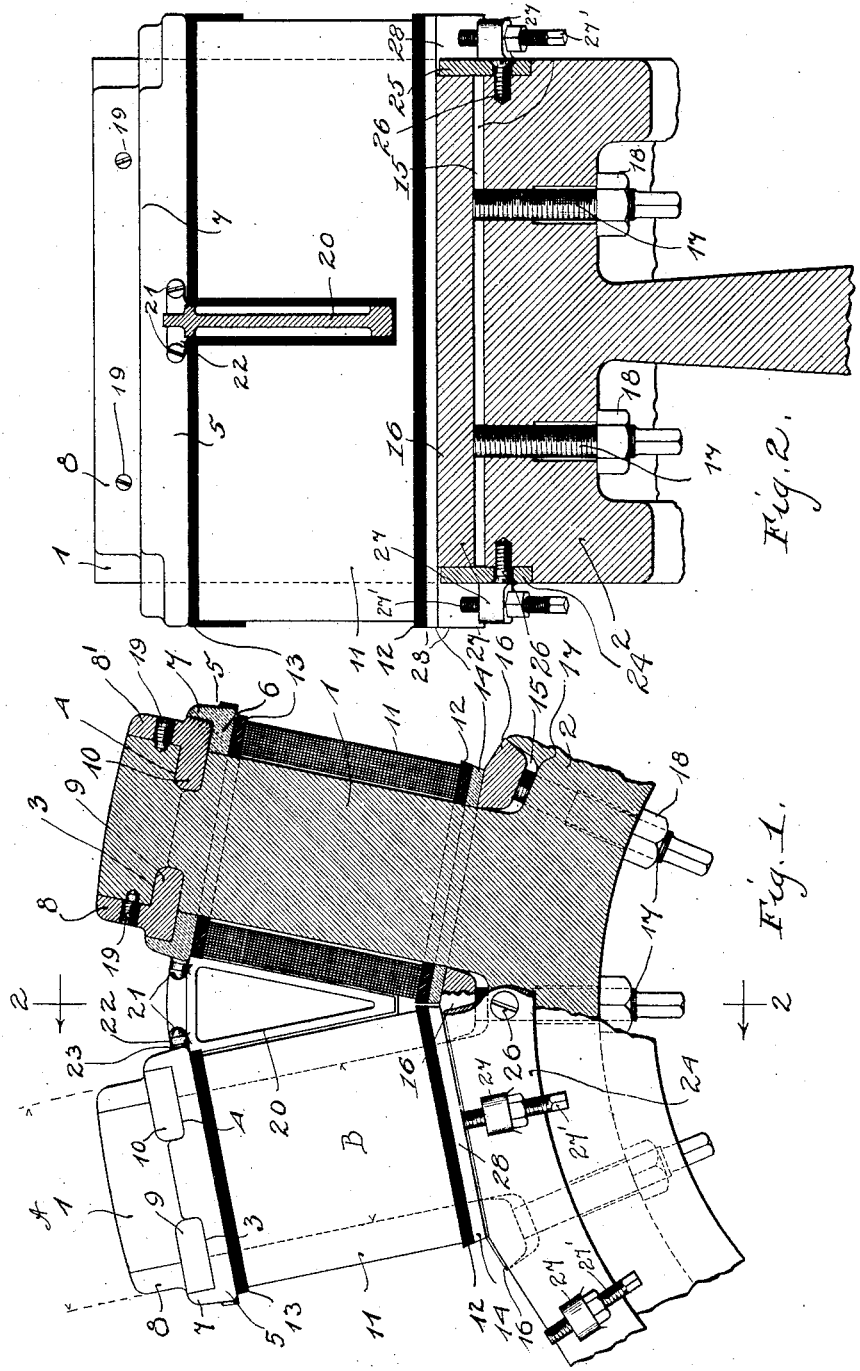
Witnesses:
Lernard W. Novander.
Charles J. Schmidt.
Inventor
William L. Waters
By Charles A. Brown
Attorney

UNITED STATES PATENT OFFICE.

WILLIAM L. WATERS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

DYNAMO-ELECTRIC MACHINE.

No. 853,285.     Specification of Letters Patent.     Patented May 14, 1907.

Application filed September 5, 1905. Serial No. 277,121.

*To all whom it may concern:*

Be it known that I, WILLIAM L. WATERS, a citizen of the United States, residing at Milwaukee, in the county of Milwaukee and State of Wisconsin, have invented a certain new and useful Improvement in Dynamo-Electric Machines, of which the following is a full, clear, concise and exact description, reference being had to the accompanying drawings forming a part of this specification.

My invention relates to dynamo electric machinery, and its object is to provide improved construction of the field poles of the revolving part and improved arrangement thereon of the winding coils.

My invention is of great importance when applied to alternating current machines in which the rotor is of comparatively large diameter thus producing great centrifugal forces and strains at the poles, and under these conditions it is practically impossible to withstand these strains if the pole pieces are separate from the frame or spider of the rotor. Furthermore the use of bolts, dovetailing or other arrangements for securing the separate poles introduces complications and expense. I, therefore, propose to cast the pole pieces in one piece with the spider and to secure the coils to the pole pieces in a very efficient and simple manner which will be best understood by reference to the accompanying drawings, in which Figure 1 shows a segmental part of the field frame of the machine, one of the poles being full and the other pole and adjacent supporting frame part being shown in section, and Fig. 2 is a sectional view taken on line 2—2 of Fig. 1.

The poles 1—1 are cast integral with the supporting frame part 2 and at their ends are provided with opposite lateral grooves 3 and 4. A retaining ring or band 5 is adapted to slip over the pole end and consists of the horizontal wall 6 and the vertical wall 7, the inner edge of the horizontal wall 6 engaging the peripheral surface of the pole piece. Keys 8 and 8' engage the end of the core and have inwardly extending flanges 9 and 10 for engagement respectively in the grooves 3 and 4, the corners of the keys engaging within the retaining ring 7. The coil 11 which may be previously wound is first slipped over the pole piece between the insulating washers 12 and 13, a brass washer 14 being also provided. At the base of the pole cores are the grooves 15 for receiving the clamping keys 16, and entering through the base of said grooves and engaging these keys are the screws 17 which pass through the rim of the supporting frame 2 and are engaged by the locking nuts 18.

The washers 14 and 12 are first slipped over the pole core, then the washer 13 and the ring 7, whereupon the locking key members 8 and 8' are inserted at the sides of the pole piece within the grooves 3 and 4 and the ring 7, and are driven into position and then held in place by the set screws 19 as shown. The keys 16 are then slipped into the grooves 15 below adjacent washers 14 and the screws 17 are turned against them, and each coil is then securely clamped between the washers 14 and the ring 7, the clamping strains and subsequent centrifugal strains being all carried by the locking keys 8 and 8' and the end of the pole.

In order to prevent the individual turns of the coils from working out, radially, wedge shaped coil retainers 20 are inserted between adjacent coils and are held in position by means of screws 21 engaging through the ears 22 of the wedge frames and having threaded engagement with the lugs 23 extending from the rings 7. These wedges are placed in position before the coil is clamped to prevent bulging of the coil or escape of individual conductors. Annular plates 24 and 25 are secured to the sides of the supporting frame rim by means of screws 26 and are provided with lugs 27 through which pass screws 27' for supporting and adjusting the overhanging ends 28 of the coils, these plates serving also to retain the keys 16 in position within their slots 15 and also to add to the general appearance of the machine.

The pole cores by being thus cast integral with the spider frame are entirely safe against centrifugal strains, and the coils are securely and rigidly clamped to the pole pieces and at all times fully exposed to the whole windage of the machine. The locking keys 8 and 8' are of steel and being shaped as shown are effective as part of the pole faces, thus giving an effective width of pole face designated by A, while the width of the pole core is only B. This enables economy in copper as the length per turn may be much smaller. The effective pole face area may be made larger or smaller depending upon the shape of these keys.

I do not wish to be limited to the precise construction and arrangement of the parts herein shown, as modifications may readily be made without departing from the spirit of the invention.

What I claim as new and desire to secure by Letters Patent is:

1. The combination with the rotating frame of a dynamo electric machine, of pole cores extending therefrom, separable abutments at the ends of the pole cores, said abutments being rigid after application to the pole cores, movable abutments at the bases of the pole cores, coils surrounding the cores between the rigid and movable abutments, and clamping mechanism supported from the frame for clamping the coils securely between the movable and rigid abutments.

2. The combination with the rotating frame of a dynamo electric machine, of pole cores extending therefrom, separable abutment members adapted to be rigidly secured to the ends of the pole cores, movable clamping members applied at the bases of the cores, coils on the pole cores between the rigid and movable abutment members, and clamping screws extending through the frame for engagement with the movable abutment members, actuation of said screws serving to clamp the coils securely between the rigid and movable abutment members.

3. The combination with the rotating frame of a dynamo electric machine, of pole cores extending therefrom and integral therewith, separable abutment members adapted to be rigidly secured to the ends of the pole cores, movable clamping members applied at the bases of the cores, coils on the pole cores between the rigid and movable abutment members, and clamping screws extending through the frame for engagement with the movable abutment members, actuation of said screws serving to clamp the coils securely between the rigid and movable abutment members.

4. The combination with the rotating frame of a dynamo electric machine, of pole cores extending therefrom, lateral grooves at the end of the pole cores, flanged locking or abutment members adapted to engage at the pole core ends and within said grooves to form rigid abutments, a movable abutment or washer engaging at the bases of the pole cores, coils disposed between said rigid and movable abutment members, and clamping mechanism supported from the rotating frame for engaging the movable abutment members to clamp the coils firmly against the rigid abutments.

5. The combination with the rotating frame of a dynamo electric machine, of pole cores extending therefrom, lateral grooves at the end of the pole cores, flanged locking or abutment members adapted to engage at the pole core ends and within said grooves to form rigid abutments, movable abutments or washers engaging at the bases of the pole cores, coils disposed between said rigid and movable abutment members, and clamping screws extending through the rotating frame into engagement with the movable abutments whereby the coils may be securely clamped against the rigid abutments.

6. The combination with the rotating frame of a dynamo electric machine, of pole cores extending therefrom, a retaining ring or band surrounding each pole core at the end thereof, a locking member for each pole core adapted to be secured to the end thereof to offer a rigid abutment for the retaining ring, a movable retaining ring engaging about the base of each pole core, a coil on each core between the retaining rings, and clamping mechanism supported from the frame for engaging the movable retaining ring to clamp the coils securely between said rings.

7. The combination with the rotating frame of a dynamo electric machine, of pole cores extending therefrom, a retaining ring or band surrounding each pole core at the end thereof, locking members for each pole core adapted to be secured to the end thereof to offer a rigid abutment for the retaining ring, a movable retaining ring engaging about the base of each pole core, a coil on each core between the retaining rings, and clamping screws supported from the frame for engaging the movable retaining ring to clamp the coil securely against the rigid retaining ring.

8. The combination with the movable frame of a dynamo electric machine, of pole cores extending therefrom, lateral grooves at the end of each pole core, a retaining ring surrounding each pole core below said grooves, locking members for engaging the end of the pole core and within said grooves to offer a rigid abutment for the retaining ring, a clamping washer surrounding each pole core at the base thereof, a coil on each core between the retaining ring and the clamping washer, and clamping screw mechanism supported from the frame for engaging the clamping washer and for securely clamping the core against the rigid retaining member.

9. The combination with the rotating frame of a dynamo electric machine, of pole cores extending therefrom and integral therewith, grooves at the ends of said pole cores, locking members engaging in said grooves to form a rigid abutment at the ends of the pole cores, a coil surrounding each pole core, and clamping mechanism for clamping said coils in firm engagement against the abutment members.

10. The combination with the rotating frame of a dynamo electric machine, of pole cores extending therefrom, grooves at the end of each pole core in the side faces thereof, locking members for engaging the sides of each pole core and in said grooves to form a rigid abutment, a clamping washer surrounding each pole core at the base thereof, a coil disposed between said clamping washer and the abutment member, and clamping screws extending from the frame and adapted for engagement with said clamping washers to clamp the coils securely against the abutment member.

11. The combination with the rotating frame of a dynamo electric machine, of pole cores extending therefrom, grooves at the end of each pole core in the side faces thereof, a retaining ring surrounding the end of the core, locking members for each pole core disposed at the end thereof and engaging in said grooves to form a rigid abutment for the retaining member, a clamping washer at the base of each pole core, a coil on each core between said washer and retaining member, clamping keys between the frame and the clamping washers, and clamping screws engaging said clamping keys, actuation of said screws causing the coils to be clamped securely between said washers and said retaining members.

12. The combination with the rotating frame of a dynamo electric machine, of pole cores extending therefrom and having parallel opposite grooves at their ends, separable locking or abutment members adapted to be slid into said grooves to form a rigid abutment, a coil on each pole core, clamping mechanism supported from the frame for clamping the coil firmly against the abutment, and retaining wedges disposed between adjacent coils to prevent radial displacement of the windings thereof.

13. The combination with the rotating frame of a dynamo electric machine, of pole cores extending therefrom and having opposite parallel grooves at the ends thereof, a retaining member or band encircling each pole core, locking members for each pole core adapted to slide in said grooves to form a rigid abutment for the retaining member, a coil for each core, clamping screws extending through the frame for clamping said coil securely against the retaining member and abutment, and retaining wedges secured to the retaining members and extending between adjacent coils to prevent lateral displacement of the windings thereof.

14. The combination with the rotating frame of a dynamo electric machine, of pole cores extending therefrom and integral therewith, said pole cores having opposite parallel grooves at the end thereof, flange shaped locking keys adapted to be slid into said grooves to form a rigid abutment, a clamping washer encircling each pole core at the base thereof, clamping screws extending through the frame for engaging said washers to clamp the coils between said washers and the abutments, and retaining members disposed between adjacent coils to prevent lateral displacement of the windings of said coils.

15. The combination with the rotating frame of a dynamo electric machine, of pole cores extending therefrom and being of the same width as the frame, there being opposite parallel grooves at the end of each pole core, a retainer washer at the end of each pole core, locking keys for engaging the end of the pole cores and in said grooves to offer rigid abutments for the retaining washers, a clamping washer at the base of each core, clamping keys for engaging the clamping washers with adjacent cores, coils on said cores disposed between the clamping and the retaining washers, clamping screws passing through the frame into engagement with said clamping keys and adapted upon actuation to cause the coils to be securely clamped between the retaining and clamping washers, and retaining wedges secured to the retaining washers and disposed between adjacent coils to prevent lateral displacement of the windings thereof.

16. The combination with the rotating frame of a dynamo electric machine, of pole cores extending therefrom and being of the same width as the frame, there being opposite parallel grooves at the end of each pole core, a retainer washer at the end of each pole core, locking keys for engaging the end of the pole cores and in said grooves to offer rigid abutments for the retaining washers, a clamping washer at the base of each core, clamping keys for engaging the clamping washers of adjacent cores, coils on said cores disposed between the clamping and the retaining washers, clamping screws passing through the frame into engagement with said clamping keys and adapted upon actuation to cause the coils to be securely clamped between the retaining and clamping washers, and annular end plates secured to the frame for retaining said clamping keys in position.

17. The combination with the rotating frame of a dynamo electric machine, of pole cores extending therefrom and being of the same width as the frame, there being opposite parallel grooves at the end of each pole core, a retaining washer at the end of each pole core, locking keys for engaging the end of the pole cores and in said grooves to offer rigid abutments for the retaining washers, a clamping washer at the base of each core, clamping keys for engaging the clamping washers of adjacent cores, coils on said cores disposed between the clamping and the retaining washers, clamping screws passing through the frame into engagement with said clamping keys and adapted upon actuation to cause the coils to be securely clamped between the retaining and clamping washers, annular end plates secured to the frame for retaining the clamping keys in position, and brackets extending from said end plates and engaging the clamping washers for supporting the overhanging ends of the coils.

18. The combination with the rotating frame of a dynamo electric machine, of pole cores extending therefrom and integral therewith, a rigid abutment at the end of each pole core, a movable abutment at the base of each pole core, clamping mechanism supported from the frame for clamping a coil on said core firmly against the rigid abutment, and retaining wedges between adjacent coils for preventing bulging and displacement of the windings thereof.

19. The combination with the rotating frame of a dynamo electric machine, of pole cores extending therefrom and integral therewith, grooves at the end of each pole core in the sides thereof, a retaining ring for each core consisting of a horizontal part engaging at its inner edge about the pole core periphery and having a vertical extension at its other end, locking keys for each pole core, each key consisting of a vertical part for engagement with the side of the pole end beyond the corresponding groove, a horizontal part extending from the vertical part for engagement with the corresponding groove, the corner of said keys engaging within the retaining ring and having an abutment for the retaining ring, a washer surrounding the base of each core, a coil for each core disposed between the retaining ring and the washer, clamping keys engaging the washers of adjacent coils, and clamping screws extending through the frame into engagement with said clamping keys and adapted upon actuation to cause the coils to be securely clamped between the retaining rings and washers, the end faces of the vertical parts of the locking keys being continuous with the corresponding pole face, said locking keys being of magnetic material.

20. The combination with the rotating frame of a dynamo electric machine, of pole cores extending therefrom having the same width as the frame, an abutment at the end of each pole core, a coil on each core, clamping means for clamping each coil against the corresponding abutment, annular end plates secured to the frame, lugs extending from said frame below the overhanging ends of the coils, and set screws passing through said abutments for engagement with the overhanging ends of the coils.

21. The combination with the rotating frame of a dynamo electric machine, of pole cores extending therefrom, each surrounded by a coil having overhanging ends, means for clamping said coils to said pole cores, end plates on the frame at the bases of the coils, lugs extending from said end plates, and adjustable screws through said lugs for supporting and adjusting the overhanging ends of the coils.

22. The combination with the rotating frame of a dynamo electric machine, of pole cores extending therefrom and having ends overhanging the sides of the frame, stationary abutment means at the end of each core, coils on the cores, clamping means for engaging under the overhanging and adjacent sides of the coils for clamping said coils against the abutments, end plates at the sides of the frame below the overhanging ends of coils, lugs extending from said plates, and adjusting screws extending through said lugs into engagement with the overhanging ends of the coils.

23. The combination with the rotating frame of a dynamo electric machine, of pole cores extending therefrom and integral therewith, a coil surrounding each pole core, and keys engaging at the end of said pole cores for resisting the centrifugal force of the coils, said keys being so shaped and arranged as to form an effective magnetic part of the pole faces and to make the effective width of the pole face greater than that part of the pole core which is surrounded by the coil.

24. The combination with the rotatable frame of a dynamo electric machine, of pole cores extending therefrom and integral therewith, a coil surrounding each pole core, parallel slots at the sides of the pole cores, keys in said slots arranged to take up the centrifugal force of the magnet coils as the frame revolves, and side members extending from said keys for increasing the effective width of the pole face, said keys forming an effective magnetic part of the pole end.

25. The combination with the rotatable part of a dynamo electric machine, of pole cores extending therefrom and integral therewith, said pole cores being of substantially uniform width, a coil on each pole core, keys engaging at the ends of each pole core for retaining the coil in position thereon and for resisting the centrifugal force of the coil as the frame rotates, said keys being shaped and arranged to form an effective magnetic part of the pole end and to increase the effective width of the pole face.

26. The combination with the rotatable frame of a dynamo electric machine, of pole cores extending therefrom and integral therewith, said pole cores being substantially of uniform width throughout their length, a coil on each pole core adapted to be slipped thereover, parallel grooves in the sides of the pole cores, keys for each pole core extending into the grooves to retain the coil in position on the core and to take up the centrifugal force thereof as the frame rotates, extensions from said keys engaging the sides of the pole ends to increase the width thereof, said keys being of magnetic material and thus causing the effective width of the pole face to be greater than that of the pole core.

27. The combination with the rotatable frame of a dynamo electric machine, of pole cores extending therefrom and integral therewith, a coil surrounding each pole core adapted to be slipped thereover, parallel grooves in the sides of the pole cores near the end thereof, keys for engaging in said grooves to retain said coils in position and to take up the centrifugal strains thereof as the frame rotates, extensions from said keys engaging the sides of the pole core at the end thereof to increase the width of the pole ends beyond the width of the parts surrounded by the coil, said keys being of magnetic material.

In witness whereof, I hereunto subscribe my name this 31st day of August A. D., 1905.

WILLIAM L. WATERS.

Witnesses:
JOHN E. HUBEL,
NELLIE QUIGLEY.